(12) United States Patent
Romeu Guardia

(10) Patent No.: US 9,828,794 B2
(45) Date of Patent: Nov. 28, 2017

(54) KIT FOR THE ARTICULATED CONNECTION BETWEEN DIVIDING PANELS IN STABLES OR SHEDS

(71) Applicant: ROTECNA, S.A., Agramunt (ES)

(72) Inventor: Gener Romeu Guardia, Agramunt (ES)

(73) Assignee: ROTECNA, S.A., Agramunt (ES)

( * ) Notice: Subject to any disclaimer, the term of this patent is extended or adjusted under 35 U.S.C. 154(b) by 0 days.

(21) Appl. No.: 15/206,388

(22) Filed: Jul. 11, 2016

(65) Prior Publication Data

US 2017/0016257 A1 Jan. 19, 2017

(30) Foreign Application Priority Data

Jul. 16, 2015 (ES) ................ 201530829 U

(51) Int. Cl.
*E05D 7/10* (2006.01)
*E05D 3/02* (2006.01)

(52) U.S. Cl.
CPC ............ *E05D 7/1044* (2013.01); *E05D 3/02* (2013.01); *E05D 7/1005* (2013.01); *E05D 2007/1027* (2013.01); *E05Y 2201/676* (2013.01); *E05Y 2900/142* (2013.01); *Y10T 16/535* (2015.01)

(58) Field of Classification Search
CPC .......... E05D 7/10; E05D 7/1044; E05D 7/105
USPC ................. 16/254, 261, 265, 266, 268, 86.1
See application file for complete search history.

(56) References Cited

U.S. PATENT DOCUMENTS

| 417,234 | A | * | 12/1889 | Davis | ..................... E05D 7/105 16/266 |
| 2,080,764 | A | * | 5/1937 | Crawford | ........... B62D 33/0222 296/10 |
| 4,854,009 | A | * | 8/1989 | Brockhaus | ................ E05D 5/12 16/263 |
| 4,858,274 | A | * | 8/1989 | Harrison | ............... E05D 7/1044 16/265 |
| 5,071,185 | A | * | 12/1991 | Schiele | ..................... B60P 3/42 16/261 |
| 5,127,132 | A | * | 7/1992 | Karlin | ................... E05D 7/1044 16/261 |
| 9,238,928 | B2 | * | 1/2016 | Johnson | ................ E05D 7/1044 |

* cited by examiner

*Primary Examiner* — Jeffrey O Brien
(74) *Attorney, Agent, or Firm* — Sughrue Mion, PLLC

(57) ABSTRACT

A kit for articulated connection between dividing panels having a pair of male pieces with a coupling protrusion; and a pair of female pieces with a coupling hole, the protrusions engage the holes when relative vertical movement between the pair of male and female pieces is produced when fixed to the panels. One of the first or second pair of pieces is configured with a depression such that the coupling protrusion or the coupling hole is arranged in the groove. The kit includes an auxiliary piece with a retaining pin actuatable with a lever and with an angled end, fixable to the lateral wing of one of the male pieces, the pin remaining parallel to the lateral wing and outside the panel. Regulated by the lever, the angled retaining end of the pin can be arranged in at least two positions: a release position and a locking position.

8 Claims, 4 Drawing Sheets

KIT FOR THE ARTICULATED CONNECTION BETWEEN DIVIDING PANELS IN STABLES OR SHEDS

TECHNICAL SECTOR OF THE INVENTION

The invention relates to a kit with male and female pieces which interlock with each other and which, mounted on the vertical edges of adjacent panels, allow the articulated connection thereof.

BACKGROUND OF THE INVENTION

In the scope of stable installations and more particularly sheds, it is common to use panels to delimit spaces.

Pieces, which are coupled in pairs in the edges of the panels, are used for the connection between panels. There are male pieces which have coupling protrusions and female pieces which have coupling holes such that by conveniently coupling these pieces in the adjacent edges of two panels, it is possible to engage the coupling protrusions into the coupling holes and thus to articulatedly connect the panels.

The engagement is produced with a relative movement between the pieces and as the pieces are coupled to the panels it is therefore necessary to produce a relative movement between the panels.

More specifically, the pieces are adapted so that, being coupled to the panels, this relative movement is in a vertical direction. Consequently, in order to engage or disengage the pieces, it is necessary to raise one of the two panels.

It is of interest that in order to reduce the separation between the panels connected in this way, the coupling protrusions or the coupling holes are located in grooves formed into the edge of the panels.

A solution is specifically known that comprises two female pieces coupled to the edge of a panel and each one provided with an arm which extends from the edge of the panel with a coupling hole at the end thereof; and two male pieces which are coupled to two grooves made in the edge of another adjacent panel and which each comprise a straight coupling protrusion which is projected upwards from the lower face of the groove. In order to connect the panels, it is necessary to raise the panel which has the female pieces and bring it closer to the panel which has the male pieces until the arms of the female pieces coupled in the grooves of the panel with the male pieces are introduced and allowing the first to fall when the coupling holes are arranged axially aligned with the coupling protrusions. In order to avoid the disconnection between panels, the female pieces have a retaining pin which can be arranged, actuated by a lever, from the edge of a panel and introduced into the groove of the adjacent panel. In these circumstances, the panel with the female pieces cannot be elevated in order to disengage the retaining protrusions of the pieces coupled to the adjacent panel due to mechanical stop of this retaining pin against the upper wall of the groove.

A drawback associated with this solution is that the panel where the female piece is coupled with the pin has to the removed in order to house the pin and especially so that the lever can extend from the retaining pin, located in the plane of the panel to the exterior.

In addition, the female pieces have a hollow which fits into the removed part of the panel with sufficient width so as to allow the lever to be able to be actuated in the direction of longitudinal displacement of the retaining pin, but also to rotate until it adopts a horizontal position such that it can be pulled in order to raise the associated panel during the engaging and disengaging operations. This hollow is, however, an undesired source of dirt since it is a hollow which can accumulate dust, grease and other debris. Furthermore, the installer must carry out a removal or perforation operation on the panel in order to receive the hollow of the piece and this can cause an incorrect installation of the kit.

Lastly, with the panel with the female pieces supporting weight, it is not easy to fit the coupling holes into the coupling protrusions of the male pieces coupled to the adjacent panel. Consequently, the connection and disconnection operation becomes too difficult.

A kit of pieces which resolves these drawbacks is an objective of the invention.

DESCRIPTION OF THE INVENTION

The kit of the invention is suitable for the articulated connection between panels, of the type which are used in stables or sheds for delimiting spaces and which comprises a first pair of male pieces with a coupling protrusion and at least one lateral wing prepared for being coupled at different levels on the vertical edge of a panel by means of fixing the wing to the edge of the panel and such that the coupling protrusion is arranged in the plane of the panel, and a second pair of female pieces with a coupling hole and at least one lateral wing prepared for being coupled to the vertical edge of another adjacent panel at the same level that the pair of male pieces by means of fixing the wing to the edge of the cited other panel and in a manner that the coupling hole is orientated horizontally and in the plane of the same, the coupling protrusions and the coupling holes being configured such that the protrusions are capable of engaging into the holes when a simultaneous relative vertical movement between the first and the second pair of male and female pieces is produced when they are conveniently fixed to the panels and thus articulatedly connect the respective panels, wherein one of the first or second pair of pieces also has a depression configured for fitting into a groove formed on the edge of the corresponding panel such that the coupling protrusion or, where appropriate, the coupling hole are arranged in the cited groove.

Essentially the kit is characterized in that it comprises an auxiliary piece provided with a retaining pin actuatable with a lever and with an angled end, the pin being mounted in a guided manner into the auxiliary piece with the capacity to be slid longitudinally and rotate about the axis thereof and this auxiliary piece being prepared to be fixed to the lateral wing of any one of the male pieces, the pin remaining parallel to the lateral wing and consequently outside the panel, but such that, regulated by the lever, the angled retaining end of the pin is capable of being arranged in at least two positions: a release position (A) in which the angled retaining end does not prevent the first and the second pair of pieces from disengaging; and a locking position (B) in which the angled retaining end is located in the depression of the female piece and exerts mechanical stop in order to prevent the relative vertical disengaging movement of the pieces from being undone.

In one variant, the male pieces generally have a "U" shape with a bridge portion intended to be placed on the edge of a panel and two lateral wings intended to be applied on opposing faces of the panel, a coupling protrusion extending from the bridge portion in a direction parallel to the lateral wings and such that a protuberance of the coupling protrusion is directed downwards; and the female pieces generally have a "U" shape, on the bridge portion of which is formed the depression intended to fit into the groove formed on the edge of the other panel, the depression defining a lower wall, equipped with a coupling hole suitable for receiving, from above, the insertion of the protuberance of a coupling protrusion of a corresponding male piece, and a cantilevered upper wall which extends above the coupling hole.

According to one embodiment, the auxiliary piece is prepared for being coupled to a lateral wing of a male piece and the length of the retaining pin is such that the angled end thereof can be arranged in the space between the lower and upper walls of the depression of the female piece in the coupling hole of which the protuberance of the coupling protrusion of the male piece is engaged.

It is of interest that the coupling holes are oblong.

It is envisaged that the coupling holes have interior walls in the area of the inclined mouth thereof, that is to say, in the form of a ramp for rotating and facilitating the introduction of a corresponding coupling protrusion.

According to another advantageous aspect in one variant, the lever is joined to the retaining pin such that in the locking position (B), the lever is orientated vertically downwards; and the auxiliary piece has an enveloping with a guide groove through which the actuating lever sticks out to the exterior, the guide groove having a safety end area configured for preventing the rotation of the lever and therefore of the retaining pin, in the direction which displaces the angled end from the groove.

Preferably, the enveloping of the auxiliary piece is devoid of a base, consequently no dirt can accumulate in the interior thereof.

In addition, in one variant, the guide groove has at least one inclined wall which, in the manner of a cam, causes the rotation of the retaining pin during the sliding of the lever along the guide groove.

DETAILED DESCRIPTION OF AN EMBODIMENT

Figure 1:
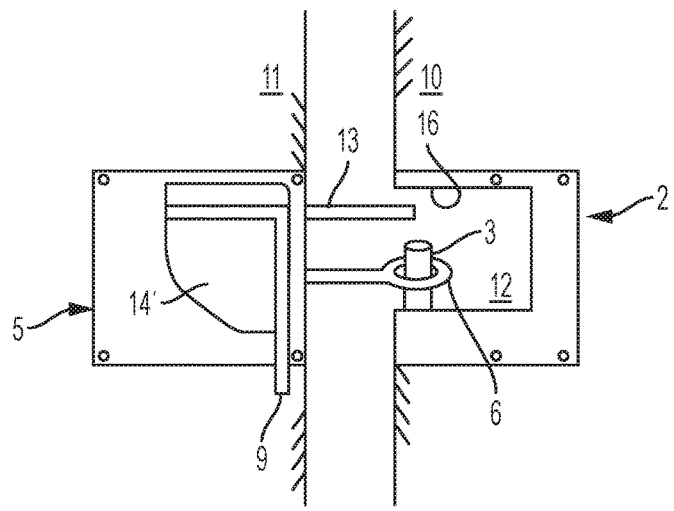
FIG. 1 is a schematic view of a male piece and a female piece coupled to the edges of two adjacent panels according to an alternative known in the state of the art.

FIG. 1 shows a male piece 2 and a female piece 5 of a known kit coupled to the edge of two adjacent panels 10, 11 and in a position such that a coupling protrusion 3 of the male piece 2 engages in a coupling hole 6 of the female piece 5. In order to avoid the accidental removal or disengaging of the male and female pieces 2, 5, the female piece has a hollow 14' which fits into a removed part which must be previously and expressly implemented in the panel 11 which serves to house a retaining pin 13 which can be displaced in a guided manner in a longitudinal direction until the distal end thereof is arranged in the groove 12 of the panel 10 where the coupling protrusion 3 of the male piece 2 is located. In this position depicted, it is not possible to raise the panel 11 in order to displace the coupling protrusion 3 from the coupling hole 6 due the distal end of the retaining pin 13 stopping against the upper wall 16 of the groove 12.

In addition to the difficulty of having to remove the panel 11 in order to house the hollow 14' of the female piece 5, the hollow 14' is capable of accumulating dirt; the lever 9 can be accidentally raised and it is complicated to fit the coupling protrusion 3 into the coupling hole 6 supporting the weight of the entire panel 11.

Figure 2:
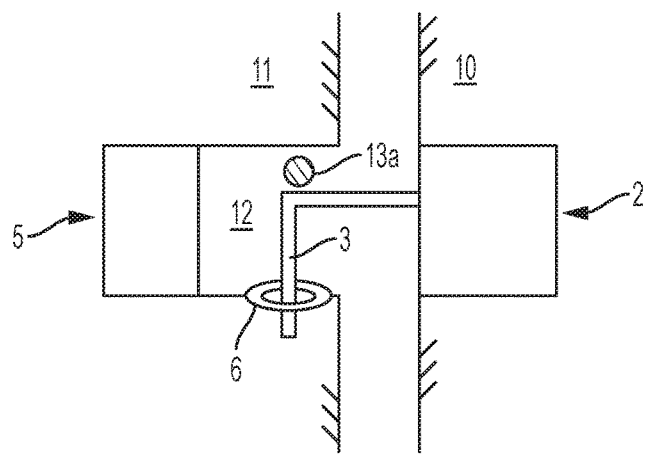
FIGS. 2 and 3 are two schematic views of a male piece and a female piece coupled to the edges of two adjacent panels according to two variants of the invention.
Figure 3:
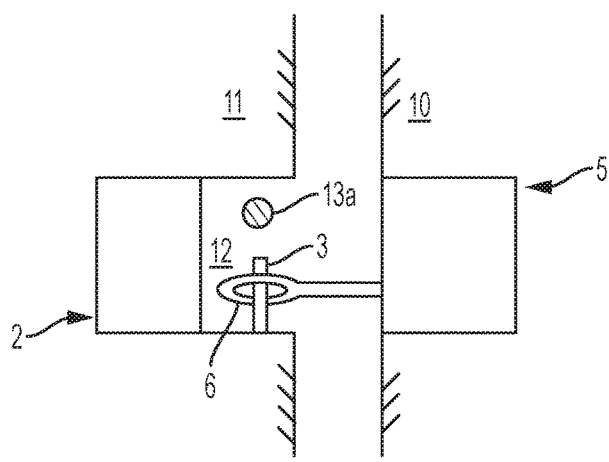

FIGS. 2 and 3 conceptually illustrate the solution which the kit 1 according to the invention adopts. In this case, it is envisaged that the retaining pin is displaced outside the plane of the panel 10, but that it is equipped with an angled retaining end 13a which, when the pin rotates about the axis thereof, can be arranged in the groove 12 and carry out the function of a mechanical stop.

Advantageously, as is explained below, the invention envisages that the retaining pin 13 is not guided into any of the male 2 or female 5 pieces, but rather into an auxiliary piece 8, prepared for being fixed to one of the male 2 or female 5 pieces according to the requirements of the installer and even once said male 2 or female 5 pieces are already coupled to the edge of the corresponding panel. The associated advantage is that it is not necessary to have to carry out any removal operation on any of the panels in order to house the retaining pin or in order to have access to the corresponding lever.

Figure 4:
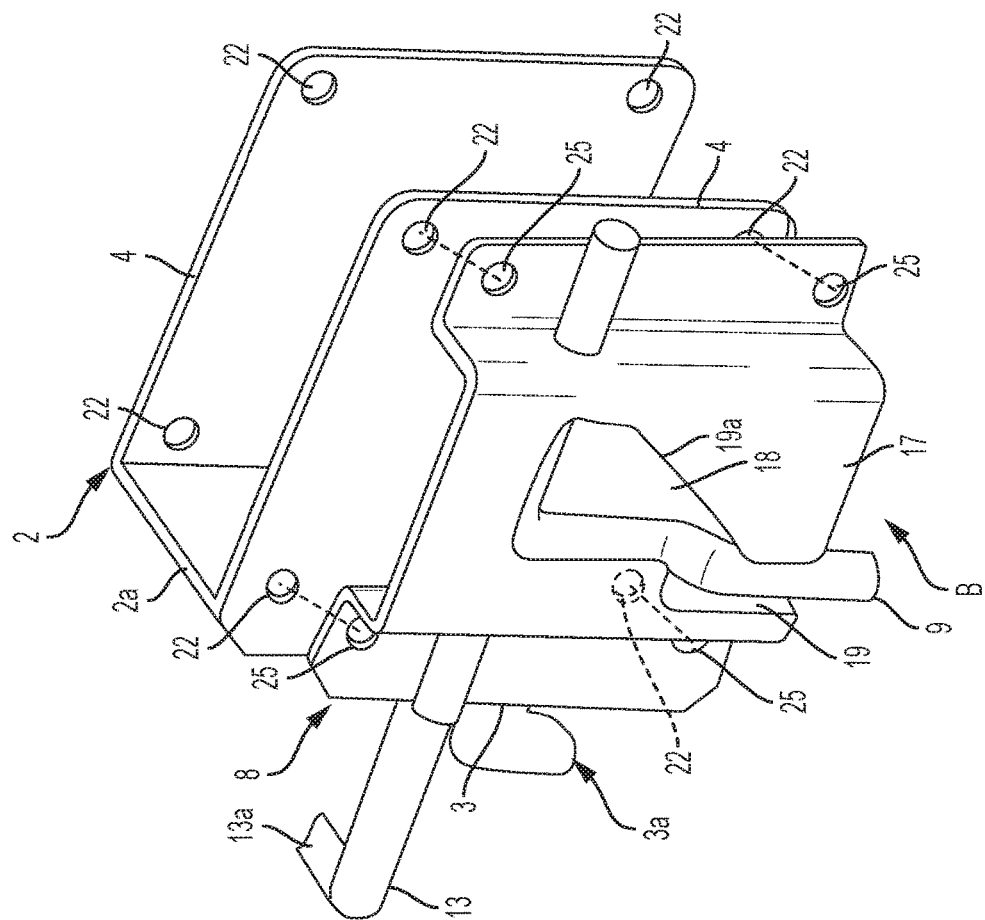
FIG. 4 is a perspective view of a male piece and a female piece of a kit according to a variant of the invention.
Figure 4:
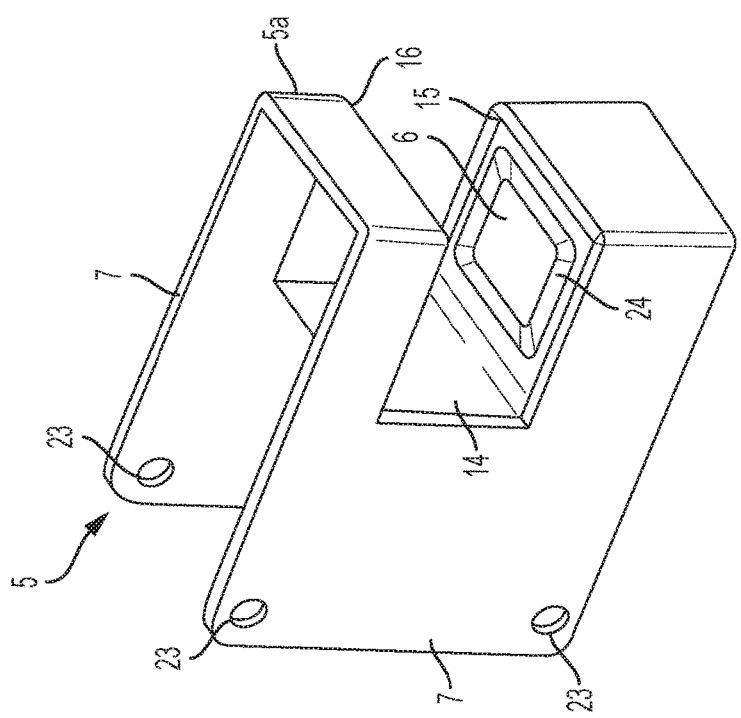

In fact, FIG. 4 shows an embodiment of the invention of particular interest for a set of male 2 and female 5 pieces which is completed with an auxiliary piece 8 depicted in a correlative coupling position with the wing 4 of the male piece 2. In one variant, the male 2, female 5 and auxiliary 8 pieces are made of metallic material.

FIG. 4 shows that the male piece 2 generally has a "U" shape with a bridge portion 2a intended to be placed on the edge of a panel and two lateral wings 4 intended to be applied and to be joined to opposing faces of the panel. For such purpose, the lateral wings 4 have holes 22 for the joining thereof, for example by screwing to the panel. A coupling protrusion 3 with a protuberance 3a directed downwards extends from the bridge portion 2a.

In turn, the female piece 5 also generally has a "U" shape, but the bridge portion thereof 5a has a depression 14 intended to fit into a groove formed on the edge of a panel to which the piece can be fixed by the lateral wings 7 thereof, intended to be applied on opposing faces of the panel. For such purpose, the lateral wings 7 have holes 23 for the joining thereof, for example by screwing to the panel.

The depression 14 defines a lower wall 15 equipped with a coupling hole 6 suitable for receiving, from above, the insertion of the protuberance 3a of the coupling protrusion 3 of the male piece 2; and a cantilevered upper wall 16 which extends above the coupling hole 6. In this view, it has been schematically depicted that the coupling hole 6 has interior walls in the area of the inclined mouth thereof, that is to say, in the form of a ramp 24 for rotating and facilitating the introduction of the protuberance 3a.

The set is completed with an auxiliary piece 8 which, by means of holes 25, is prepared for being fixed to a lateral wing 4 of the male piece 2, as FIG. 4 illustrates. With this aim, the holes 25 and 22 are expressly axially aligned so that the same screw elements can be used for fixing at the same time, as a package, the auxiliary piece 8 to the male piece 2 and the assembly to the corresponding panel.

A retaining pin 13 is mounted on the auxiliary piece 8 which, when the auxiliary piece 8 is fixed to the male piece 2, is orientated parallel to the lateral wing 4 of the male piece and consequently is outside the panel to which the assembly of male piece 2 and auxiliary piece 8 is coupled.

The retaining pin 13 can be regulated with a lever 9 which extends essentially normal to the retaining pin 13. This retaining pin 13 has an angled end 13a, the location and orientation of which depends on the operation which is carried out with the lever 9.

In order to guide the operation of the lever 9, the auxiliary piece has an enveloping 17 with a guide groove 18 through which the lever 9 sticks out to the exterior, the guide groove 18 having an end safety area 19 configured for avoiding the rotation of the lever 9 and therefore of the retaining pin 13 when it adopts a locking position B (which it adopts in FIG. 4), the function of which is explained below. The invention envisages that the guide 18 has inclined walls 19a and 19b which, in the manner of a cam, cause the rotation of the lever 9 and consequently of the angled end 13a when it is desired to slide the retaining pin 13 in the direction along the guide 18 (see FIGS. 7 and 8). In any case, as is observed in FIG. 4, the profile of the guide 18 ensures that, in the locking position B, the lever 9 is essentially vertical, with the aim of not obstructing or harming the animals on its passage through the stable or shed.

Figure 8:
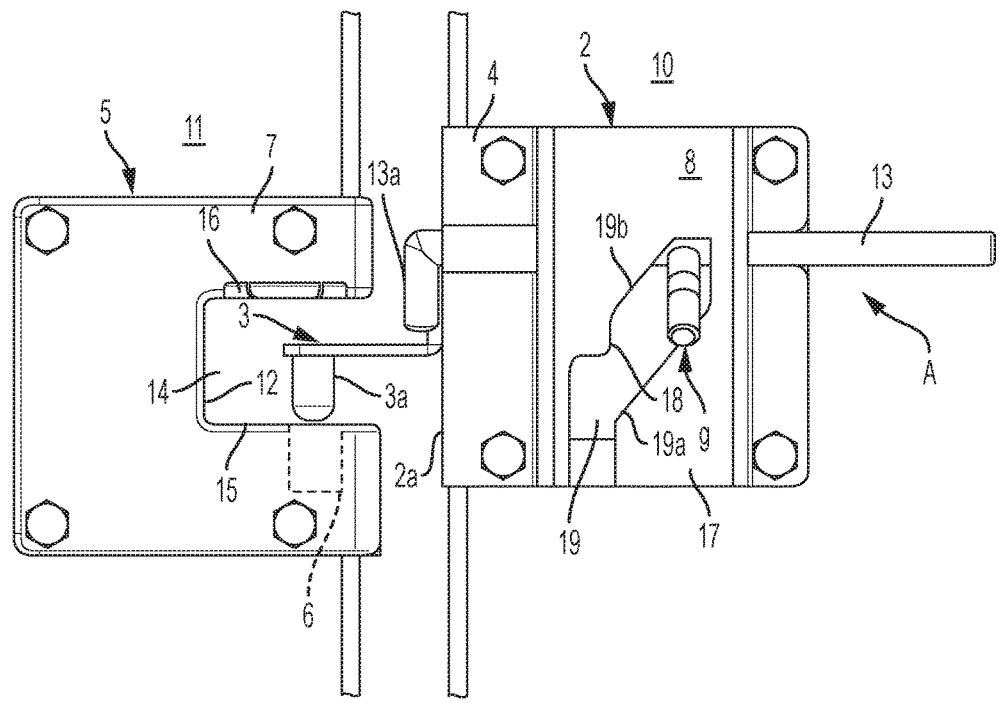

At the opposing end of the guide 18, the lever can adopt an essentially horizontal orientation, locked in a rotational direction upwards by stopping against the frame of the guide 18 itself such that, in this position, the lever can be used to raise the panel to which the assembly of the male piece 2 and the auxiliary piece 8 is joined, as is illustrated in FIG. 8.

It is interesting that the enveloping 17 of the auxiliary piece 8 is devoid of a base, therefore dirt cannot accumulate in the interior thereof.

Figure 5:
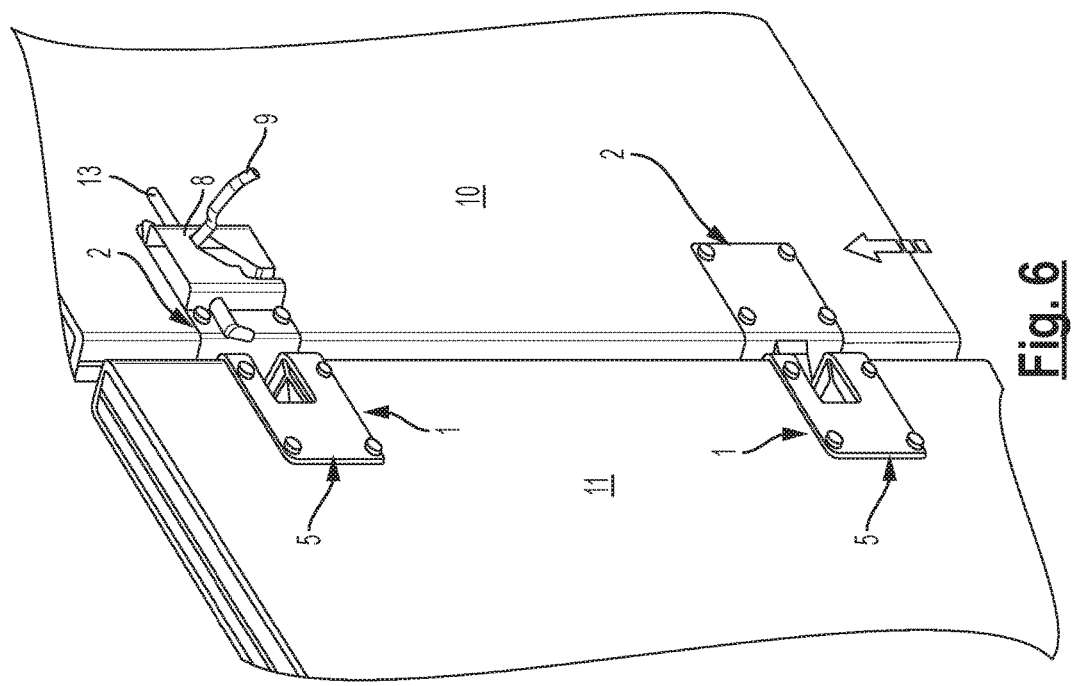
FIGS. 5 and 6 are two views of a kit according to the invention correctly installed on two adjacent panels and in locking (B) and release (A) positions, respectively.
Figure 6:
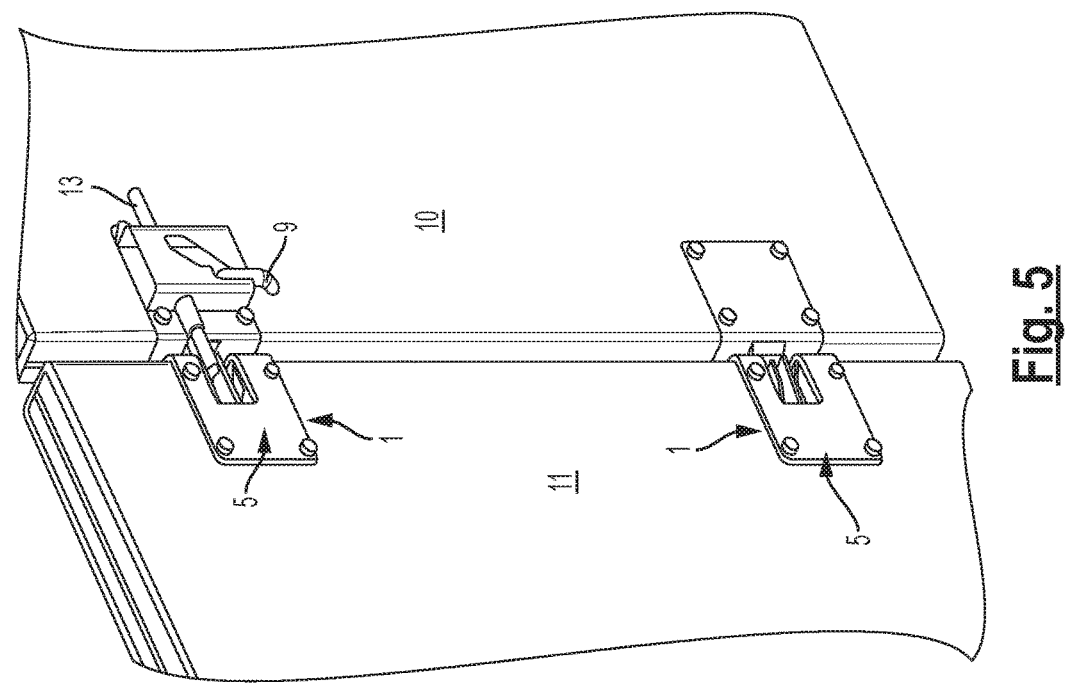
Figure 7:
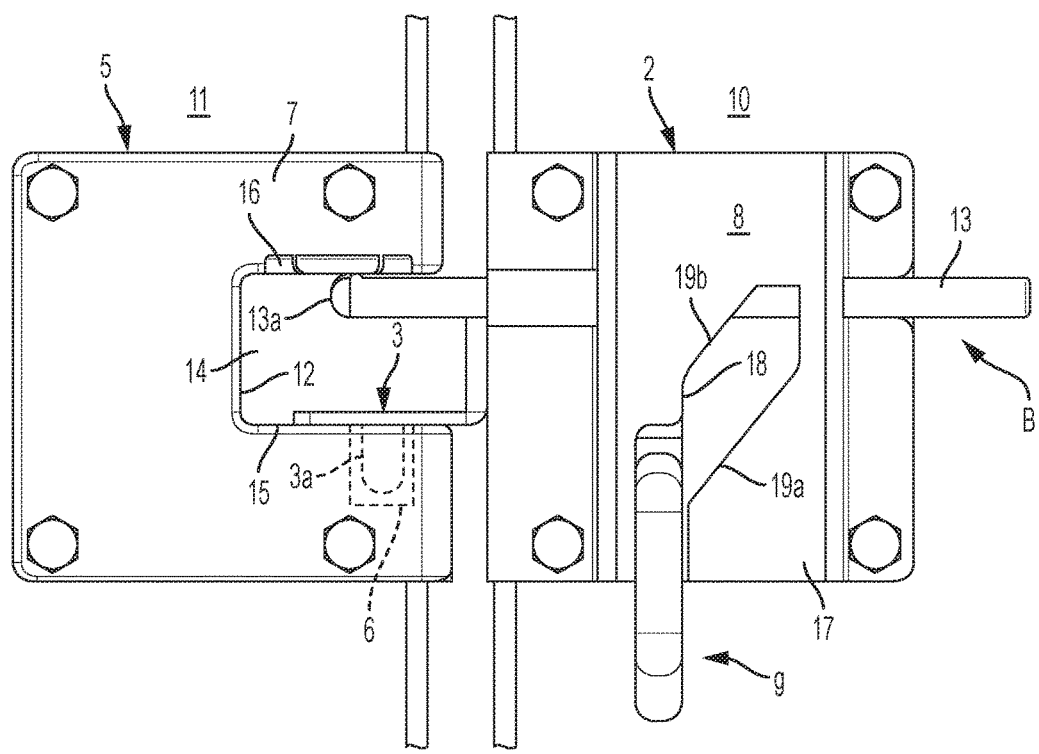
FIGS. 7 and 8 are two expanded views of the upper male and female pieces of the kit of FIGS. 5 and 6 in combination with the auxiliary retaining piece, the retaining pin adopting a locking (B) and release (A) position respectively.

The complete installation of the kit 1 is illustrated in FIGS. 5 and 6 in which the lever 9 and the retaining pin 13 adopt a release position A or a locking position B, respectively, which are illustrated in greater detail in FIGS. 7 and 8. Note that for the correct connection between the panels 10 and 11 in an articulated manner, a pair of female pieces 5 is used arranged at different levels on the edge of the panel 11; and a pair of male pieces 2 arranged on the edge of the panel 10 corresponding to the female pieces 2.

In FIG. 5, the coupling protrusions of the male pieces 2 are simultaneously mounted on the coupling holes of the female pieces 5.

In FIG. 6, with the lever 9 having been actuated, this connection can be disengaged, raising the panel 10 with respect to the panel 11, pulling the lever 9 as the arrow illustrates in FIG. 6.

The functioning of the kit 1 is explained with the aid of FIGS. 7 and 8 below.

In FIG. 7, the panels 10 and 11 are connected to each other when the protuberance 3a associated with the male piece 2 is engaged in the coupling hole 6 of the female piece 5.

The connection cannot be disengaged with the retaining pin 13 in the locking position B. In this position, the angled end 13a of the retaining pin 13 is introduced into the depression 14 of the female piece 5 and prevents the raising of the panel 10 and the relative movement required for disengaging the protuberance 3a from the coupling hole 6.

Proceeding from this situation, it is necessary to actuate the lever 9, by displacing it towards the right in order to disengage the connection between the panels 10 and 11.

As this movement with the lever 9 is carried out, the profile of the guide 18 and especially the inclined wall 19a of the guide 18 forces the retaining pin to rotate about the axis thereof until it reaches the release position A illustrated in FIG. 8. In this position, with the retaining pin 13 having been rotated, the angled end 13a thereof is removed from the depression 14 of the female piece 5 and therefore no longer exerts a mechanical stop to prevent the relative movement between the panels 10 and 11 for disengaging the protuberance 3a associated with the male piece 2 of the coupling protrusion 6 of the female piece 5. The lever 9 is also essentially horizontal and the same can be used for pulling upwards and thus raising the panel 10 during this disengaging operation between panels.

At the moment this inverse operation is carried out, when the protuberance 3a of the male pieces 2 engages in the coupling holes 6 of the female pieces 5, the ramps 24 provided on the cited coupling holes 6 perform a self-centering function such that when the panel 10 is left to fall, the protuberances 3a can automatically engage in the corresponding coupling holes 6, although initially the first protuberances are not perfectly aligned with the center of the coupling holes. This fact greatly facilitates the coupling operation between panels.

The invention claimed is:

1. A kit for the articulated connection between dividing panels of the type used in stables or sheds for delimiting spaces which comprises a first pair of male pieces each with a coupling protrusion and at least one first lateral wing configured for being coupled at different levels on a vertical edge of a panel; and a second pair of female pieces each with a coupling hole and at least one second lateral wing configured for being coupled to a vertical edge of another adjacent panel at the same level as the pair of male pieces, the coupling protrusions and the coupling holes being configured such that the protrusions are capable of engaging into the holes when a simultaneous relative vertical movement between the first and the second pair of male and female pieces is produced when they are conveniently fixed to the panels and thus articulatedly connect the respective panels, wherein one of the first or second pair of pieces is also configured with a depression for fitting into a groove formed on the edge of the corresponding panel such that one of the coupling protrusion and the coupling hole are arranged in the groove, wherein the kit comprises an auxiliary piece provided with a retaining pin actuatable with a lever and with an angled end, the pin being mounted in a guided manner on the auxiliary piece so as to be slid longitudinally and rotate about the axis thereof and this auxiliary piece being configured to be fixed to the first lateral wing of any one of the male pieces, the pin remaining parallel to the first lateral wing and consequently outside the panel, but such that, regulated by the lever, the angled retaining end of the pin is capable of being arranged in at least two positions: a release position in which the angled retaining end does not prevent the first and the second pair of pieces from disengaging; and a locking position in which the angled retaining end is located in the depression and exerts mechanical stop in order to prevent the relative vertical disengaging movement of the pieces.

2. The kit according to claim 1, wherein the male pieces generally have a "U" shape with a first bridge portion intended to be placed on the edge of a panel and two first lateral wings configured to be applied on opposing faces of the panel, the coupling protrusion extending from the first bridge portion in a direction parallel to the first lateral wings and such that a protuberance of the coupling protrusion is directed downwards; and in that the female pieces generally have a "U" shape with a second bridge portion, in the second bridge portion is formed the depression fit into the groove formed on the edge of the adjacent another panel, the depression defining a lower wall, equipped with the coupling hole suitable for receiving, from above, the insertion of the protuberance of the coupling protrusion of the corresponding male piece, and a cantilevered upper wall which extends above the coupling hole.

3. The kit according to claim 2, wherein the auxiliary piece is configured for being coupled to the first lateral wing of the male piece and in that the length of the retaining pin is such that the angled end thereof can be arranged in a space between the lower and upper walls of the depression of the female piece in the coupling hole of which the protuberance of the coupling protrusion of the male piece is engaged.

4. The kit according to claim 1, wherein the coupling holes are oblong.

5. The kit according to claim 1, wherein the coupling holes have interior walls in the form of a ramp for guiding and facilitating the introduction of the corresponding coupling protrusion.

6. The kit according to claim 1, wherein the lever is joined to the retaining pin such that in the locking position, the lever is orientated vertically downwards; and in that the auxiliary piece has an enveloping portion with a guide groove through which the actuating lever sticks out to the exterior, the guide groove having a safety end area configured for preventing the rotation of the lever, and therefore of the retaining pin, in a direction which displaces the angled end from the depression.

7. The kit according to claim 6, wherein the enveloping portion of the auxiliary piece is devoid of a base, consequently no dirt can accumulate in the interior thereof.

8. The kit according to claim 6, wherein the guide groove has at least one inclined wall which, in the manner of a cam, causes the rotation of the retaining pin during the sliding of the lever along the guide groove.

\* \* \* \* \*